United States Patent [19]
Singer

[11] Patent Number: 5,606,555
[45] Date of Patent: Feb. 25, 1997

[54] APPARATUS AND METHOD FOR OPERATING AND CONSTRUCTING AN OPTICAL TDM/TDMA SYSTEM HAVING ENHANCED RANGE

[75] Inventor: Josef Singer, Buchloe, Germany

[73] Assignee: Siemens Aktiengesellschaft, Munich, Germany

[21] Appl. No.: 445,755

[22] Filed: May 22, 1995

[30] Foreign Application Priority Data

May 20, 1994 [DE] Germany .......................... 44 17 771.2

[51] Int. Cl.[6] ..................................... H04J 1/16
[52] U.S. Cl. .......................... 370/465; 370/442; 379/242; 359/136
[58] Field of Search .......................... 370/56, 58.1, 58.2, 370/77, 85.2, 95.3, 79, 108, 110.1, 13, 24, 29, 95.1, 100.1, 106.1, 105.6; 379/156, 219, 242; 359/137, 115, 118, 125, 167, 135, 136, 140

[56] References Cited

U.S. PATENT DOCUMENTS

| | | | |
|---|---|---|---|
| 5,170,395 | 12/1992 | Shinmyo | 370/95.3 |
| 5,214,638 | 5/1993 | Norz et al. | 370/95.3 |
| 5,363,376 | 11/1994 | Chuang et al. | 370/95.3 |
| 5,398,129 | 3/1995 | Reimann | 370/95.3 |
| 5,444,710 | 8/1995 | Fisher et al. | 370/95.3 |

FOREIGN PATENT DOCUMENTS 4405461  10/1994  Germany .

OTHER PUBLICATIONS

"Optische Übertragungstechnik für flächendeckende Teilnehmeranschlüsse (Teil 1)" Sporleader et al. Fernmelde Ingenieur, vol. 4, Apr. 1992, pp. 9–12.

"Optische Übertragungstechnik für flächendeckende Teilnehmeranschlüsse (Teil 2)" Sporleader et al. Fernmelde Ingenieur, vol. 9, Sep. 1992, pp. 24–29.

"Optische Übertragungstechnik für flächendeckende Teilnehmeranschlüsse (Teil 3)" Sporleader et al. Fernmelde Ingenieur, vol. 10, Oct. 1992, pp. 4–6 and 11–13.

Primary Examiner—Benedict V. Safourek
Assistant Examiner—Ricky Q. Ngo
Attorney, Agent, or Firm—Hill, Steadman & Simpson

[57] ABSTRACT

In conventional TDM/TDMA systems the signal blocks sent in TDMA mode from a detached unit to a central station contain a control data part whose length is derived from the signal running time in the opposite direction in TDMA mode from the central station to the detached unit at the largest distance therefrom. Any range enhancement is such a known system then leads to a longer control data part, and thus to a diminished transmission capacity for useful signals. To achieve a range enhancement without diminishing the transmission capacity, a TDM/TDMA system and a method for constructing and operating such a system are disclosed wherein, the detached units are divided into range zones and, except for the units at the largest distance from the central station, the detached units of respective range zones contain an additional, further delay, so that the transmission cycle of the detached units begins earlier than the reception cycle.

6 Claims, 4 Drawing Sheets

APPARATUS AND METHOD FOR OPERATING AND CONSTRUCTING AN OPTICAL TDM/TDMA SYSTEM HAVING ENHANCED RANGE

BACKGROUND OF THE INVENTION

1. Field of the Invention

The present invention is directed to an optical TDM/TDMA (time division multiplex/time division multiple suitable for use in a communications system, and to a method for constructing and operating such a TDM/TDMA system.

2. Description Of the Prior Art

Optical TDM/TDMA systems are known from "Optische Übertragungstechnik für flächendeckende Teilnhmeranschl üsse", No. 04/1992, Section 5, pp. 9–12, No. 09/1992, Sections 9.0 and 9.1, pp. 24–29 and No. 10/1992, Sections 11.0 on pp. 4–6 and "Opal 94", pp. 11–13 of the periodical "Der Fernmelde-lngenieur" (Verlag für Wissenschaft und Leben, Georg Heidecker GmbH, Erlangen).

What is referred to as the TDM/TDMA principle is often used in optical transmission systems for wide-area subscriber lines. A central station thereby sends message signals and control signals in time-division multiplex (TDM) mode in a defined cycle via a passive optical network that, as may be seen from FIG. 1 herein, splits in the form of a light waveguide tree structure in the direction from the central station OLT, to subscriber-proximate, detached (remote) units ONU. Each remote unit is connected to a combination of "plain old telephone system" (POTS) units and/or an integrated services digital network (ISDN). In the opposite direction, these detached units ONU transmit signal bursts containing time-division multiplex signals with the same cycle back to the central station OLT in time-division multiplex multiple access (TDMA), i.e. periodically in a preselected sequence in specific time slots. Separate light waveguide tree structures can thereby be employed for the transmission of the signals from the central station OLT and for the opposite direction; in view of reducing outlay, however, operation in full duplex mode is often accomplished with wavelength-division multiplex and only one light waveguide tree structure referred to as a "passive optical network (PON)". Compared to the reception time of the TDM signals, the detached ONU units respectively return their signal bursts to the central station OLT chronologically offset with a delay value that is individually calculated for each detached ONU unit. The delay value is selected for each detached unit ONU such that the signal bursts of all detached units ONU arrive overlap-free and frame-synchronized at the central station OLT after passing through the various fiber lengths to the central station OLT. The control and triggering of the delay thereby ensues by the central station OLT on the basis of control signals co-communicated within the time-division multiplex signals.

A frame format that is constructed basically the same for both transmission directions and is composed of a plurality of successive signal blocks is selected in a known way for the signal transmission. A single signal block is shown in FIG. 2, line 1. The signal block contains a control data part, also referred to as frame overhead (FROH), provided with the address of the detached unit ONU being addressed, this being followed by a comparatively substantially longer useful data part ND. Control commands can be sent from the central station OLT to the individual, detached units ONU in the control data part (FROH). During a calibration (set-up or "commissioning") procedure and for checking the running time during operation, signals referred to as test packet signals that contain a synchronization sequence for measuring transit time are transmitted from the detached units ONU. The acknowledgement signals for the control commands of the central station OLT as well as status information of the detached unit ONU can be transmitted from the detached unit ONU to the central station OLT.

The useful data for the respective detached unit ONU are transmitted from the central station OLT in the useful data part and the useful data of this detached unit ONU for the central station OLT are transmitted in the opposite direction. The transmission of control data thus reduces the transmission of useful data, so that attempts are made to keep the control data part FROH of the signal blocks as small as possible. This control data part, however, also serves for the transmission of the test packet signals in the periodically ensuing calibration or checking of such a TDM/TDMA system, so that the control data part—as set forth below—cannot be arbitrarily shortened.

For explanation, the calibration procedure of two detached units ONU1, ONU5 of FIG. 1 shall be considered, these being arranged at different distances from the central station OLT. It is assumed that the detached unit ONU1 is immediately adjacent to the central station OLT, so that a signal block transmitted from the central station OLT according to line Z1 of FIG. 2 arrives in the detached unit ONU1 after a negligible transit time as indicated by line Z2. The reaction time to commands of the central station OLT is set equal to a first basic delay GD1 by additional delay elements for all detached units ONU, so that the detached unit ONU1 generates a signal block according to line Z3 in response to a command of the central station OLT after this basic delay, this signal block according to line Z3 containing a test packet of measurement signals that are arranged at the end of the control data part, for measuring the transit time for the calibration procedure. This signal block is returned to the central station OLT and arrives thereat after a negligible transit time according to line Z4.

An anticipation window EWF is provided in the central station OLT, having a length corresponding to the length of the control data part FROH of the signal blocks and beginning with the end of the transmission of the control data part by the central. The test packets must arrive in this anticipation window during the calibration procedure and during periodic checking. The beginning of the anticipation window EWF for the test packets thus arises from the minimum signal running time between the central station OLT and the closest detached unit ONU, plus the first basic delay GD1 that has been set. A transit time correction LZK must thus be provided in the first detached unit ONU1 immediately adjacent to the central OLT for supplementing the signal running time on the optical fiber so that the signal block of this detached unit arrives in the central station OLT in the specified position corresponding to line 25.

Line Z6 shows a signal block that arrives after maximum signal running time corresponding to the detached unit ONU5 located at the maximum distance from the central station OLT. After the first basic delay GD1, a signal block corresponding to line Z7 is returned from the detached unit ONU5 to the central station OLT, this signal block arriving exactly in the anticipation window EWF of the central station OLT together with the control data part corresponding to line Z8. A comparison to the specified position for the signal block according to line Z9 shows that, by contrast to line Z5, a correction of running time is not required and that, moreover, the test packets of the control data part would no longer be received in the anticipation window given an even longer running time. An increase in the range of this system thus would require a larger anticipation window, or a longer control data part of the signal blocks, which would be at the expense of the useful data transmission. As a result, however, the transmission capacity for the useful data would be diminished in the overall system and the data running time in the system and the outlay would be increased because of the larger buffer memory for the useful data that would then be required.

An increase in the range is easily possible if no detached units ONU immediately adjacent to the central are present, i.e. the range of distances is not increased. In this case, the differences in the distance between central station OLT and detached units ONU would only lead to differences in the signal running time that, however, do not require an expansion of the anticipation window of the central station OLT.

SUMMARY OF THE INVENTION

An object of the present invention is to improve the above-described TDM/TDMA system such that an increase in the range is achieved without reducing the transmission capacity for the useful data and without lengthening the data running time.

In an optical TDM/TDMA system of the type initially cited, this object is inventively achieved in that a system constructed and operating in accordance with the principles of the present invention wherein the detached units are divided into a plurality of range zones, with all detached units in each range zone being within a selected range of transmission distances from the central station. All detached units in each range zone have delay means therein for delaying emission of a TDMA signal block from that detached unit, following reception of a TDM signal block, by a delay which is dependent on the range zone which contains that detached unit. All detached units in the range zone which is at the largest transmission distance have the shortest delay. All detached units in the other range zones respectively have delays which become progressively longer as the transmission distance for the range zone containing the detached unit becomes shorter. The system is operated so as to introduce a frame offset between the transmission cycle of TDM signal blocks emitted by the central station and the transmission cycle of TDMA signal blocks emitted in response thereto by the detached units. This frame offset is equal to the duration of the anticipation window multiplied by the number of range zones decremented by one. Moreover, initiation of the TDMA transmission cycle, in reply to the TDM transmission cycle, does not begin until completion of the reception cycle of the detached units for the TDM transmission cycle.

As used herein, the term "transmission distance" means the actual length or distance of optical fiber extending between the central station and a particular detached unit. Since optical fibers cannot always be laid in a "line of sight" line between the central station and a detached unit, the transmission distance may differ somewhat from the physical distance between the central station and the detached unit.

The system of the invention has the advantage that the obtainable range can be expanded to a multiple of the value, limited by the length of the control data part of the signal blocks, and thus the high output powers of transmission lasers that have now become available can be exploited better. In a preferred fashioning of the inventive system wherein the detached units are divided into two range zones, and wherein the delay of the second range zone is selected so that the signal block emitted by each detached unit in the second range zone arrives at the central station just at the beginning of the anticipation window, taking into account the aforementioned frame offset, a doubling of the range is achieved.

DESCRIPTION OF THE pREFERRED EMBODIMENTS

Figure 1:
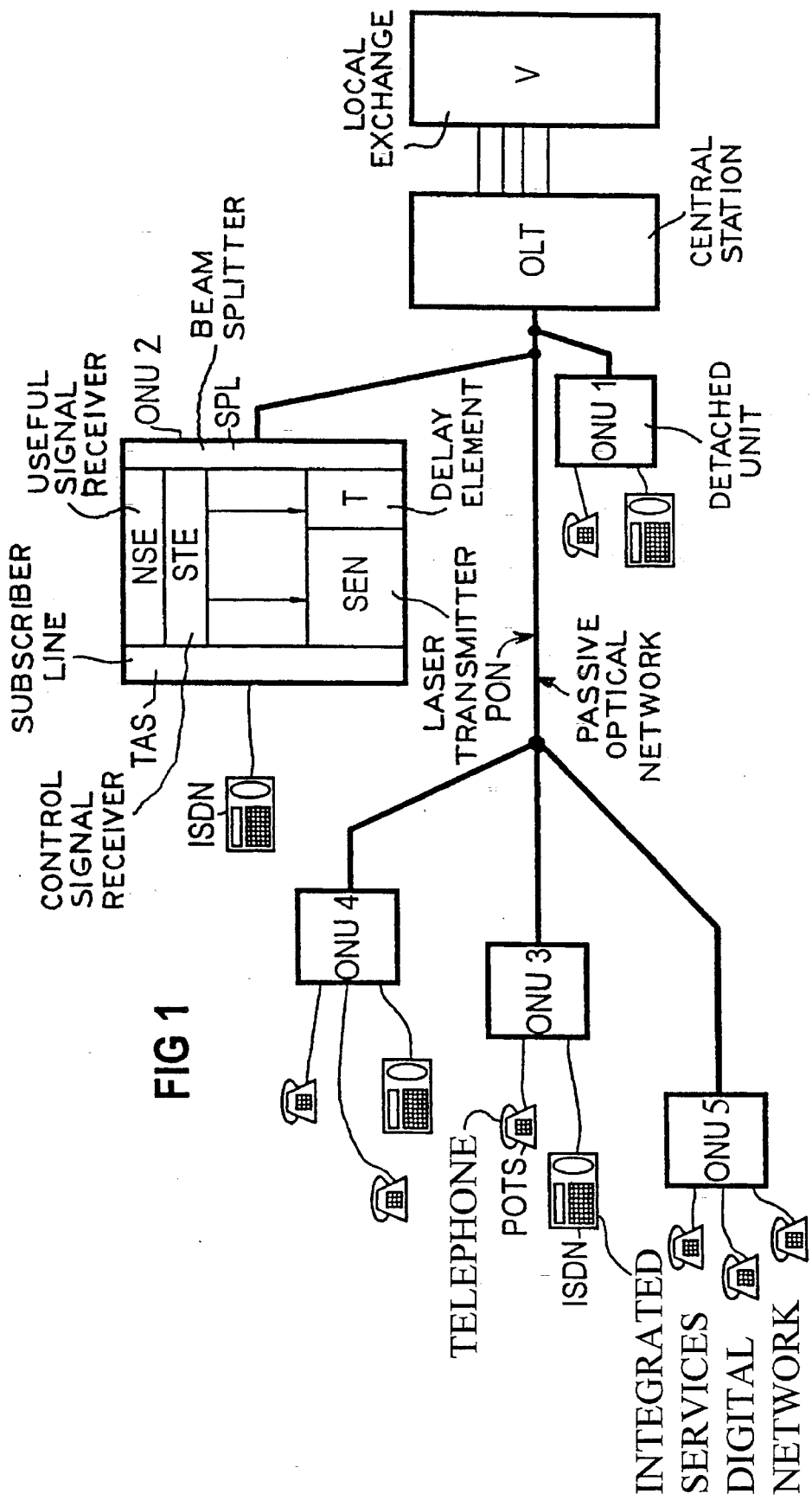
FIG. 1 shows the basic components a TDM/TDMA system having a passive optical network and detached units arranged at different distances from the central station constructed and operated in accordance with the principles of the present invention.

In FIG. 1, the central state OLT of the TDM/TDMA system is connected to the local exchange V, this central station OLT, in addition to containing control and evaluation devices, contains a laser transmitter that feeds the optical signals intended for transmission to the detached units ONU1 ... ONU5 into the passive optical network PON. The first detached unit ONU1 is located immediately adjacent to the central station OLT and the second detached unit ONU2, whose internal circuitry is shown as an example of all of the detached units ONU1 ... ONU5, is at a somewhat longer transmission distance from the central station OLT. The third through fifth detached units ONU3, ONU4 and ONU5, are located at an even longer transmission distance from the central station OLT. Each detached unit is connected to standard telephones POTS or to broadband telephone equipment ISDN allocated to individual subscribers. (It will be recognized that although five detached units are shown in this exemplary embodiment, the invention is applicable to any system having two or more such detached units, with at least one unit in each range zone.)

The internal circuitry of the second detached unit ONU2 shown as an example of all detached units contains a beam splitter SPL connected to the optical fiber input. This beam splitter SPL supplies the incoming light pulses to an opto-electrical transducer and feeds the outgoing optical pulses into the passive optical network PON. The useful signal receiver NSE and the control signal receiver STE are connected to the opto-electrical transducer. The output of the useful signal receiver NSE is connected to a subscriber line TAS that, in the present example, emits the received useful signals to an ISDN telephone and forwards signals generated by the latter to the laser transmitter SEN. There is a direct control connection between control signal receiver STE and laser transmitter SEN; a delay element T through which the useful data also pass is additionally inserted into the laser transmitter SEN. The delay element T is connected to the control signal receiver STE by an additional control line and thus the delay thereof can be switched (adjusted) proceeding from the central station OLT.

Figure 2:
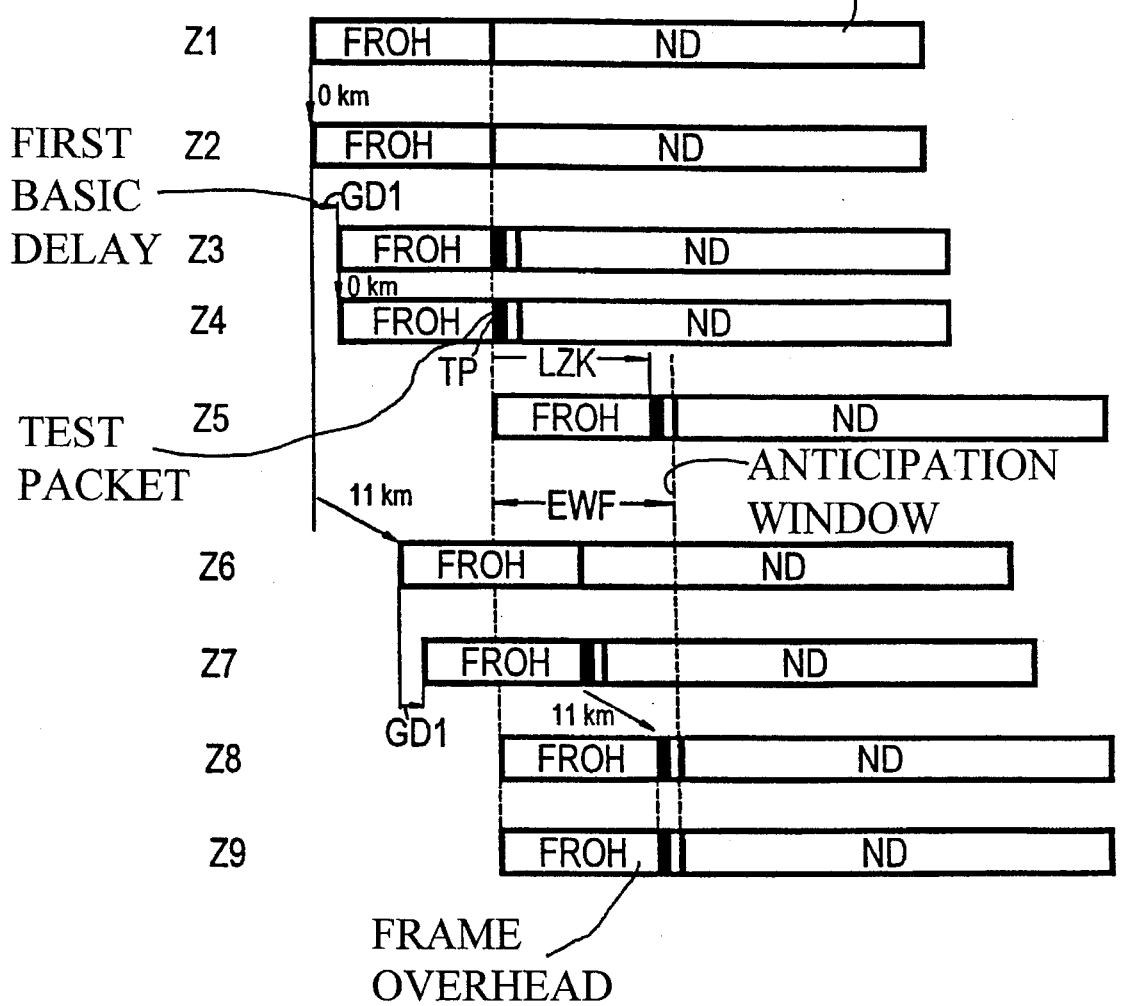
FIG. 2 as discussed above, illustrates a known calibration or checking procedure for a conventionally constructed TDM/TDMA system.

The calibration procedure for a conventional TDM/TDMA system has already been set forth in conjunction with FIG. 2. Even though certain of the components of FIG. 1 were used for exemplary purposes as "generic" units in that discussing none of the inventive features of FIG. 1 were employed.

In the TDM/TDMA system of the invention, the detached units ONU1 . . . ONU5 are divided into two range (transmission distance) zones, whereby the detached units of the range zone 1 are located at a transmission distance between 0 and 11 km and the detached units of the range zone 2 are located at a transmission distance of approximately 9 through approximately 20 km from the central station OLT.

Figure 3:
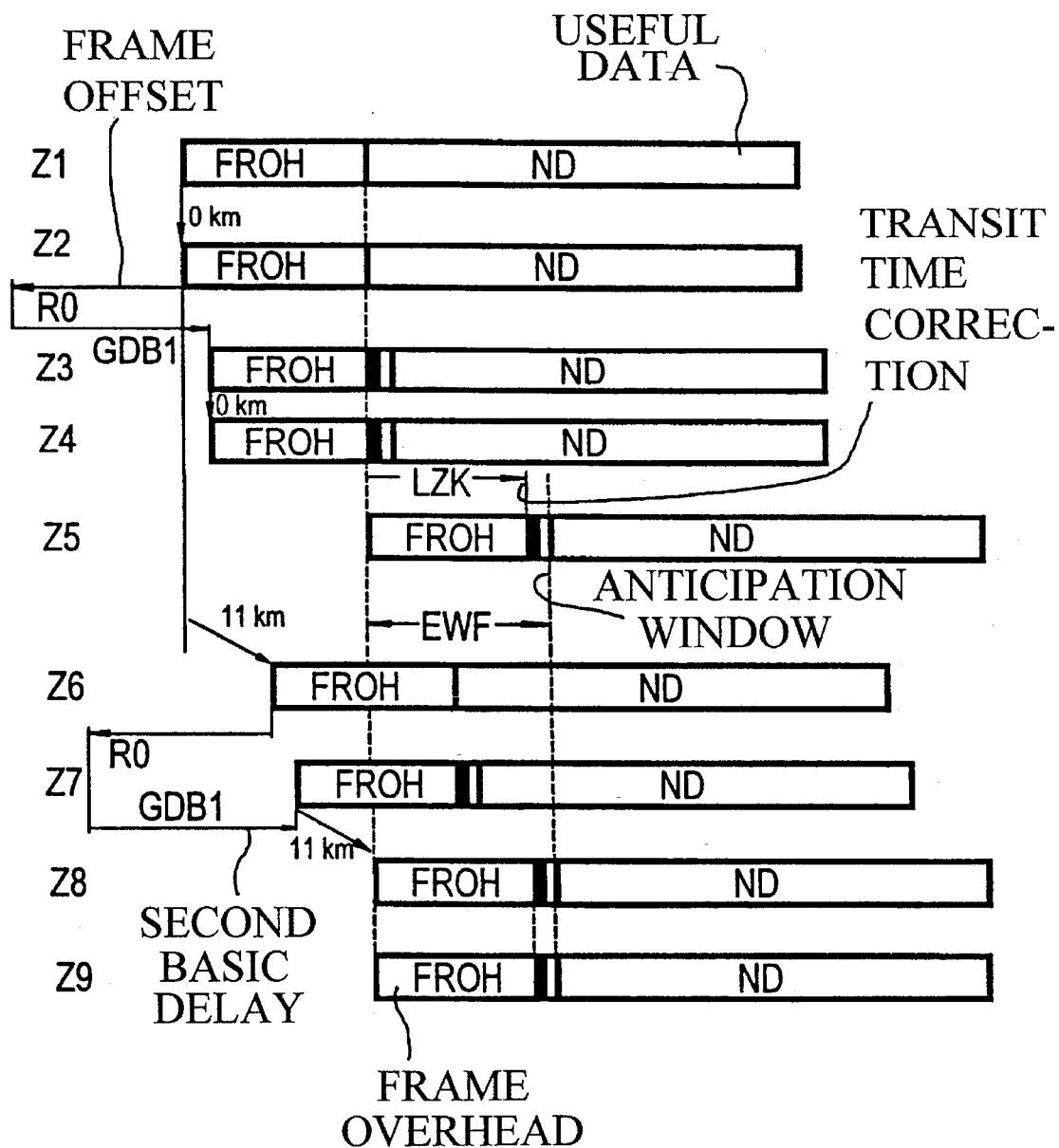
FIG. 3 illustrates a calibration or checking procedure for the system of FIG. 1 in accordance with the principles of the present invention in a first range of distances.

The calibration or checking procedure for the detached unit ONU1 located in the range zone 1 shall be set forth in conjunction with FIG. 3. Line Z1 of FIG. 3 shows a signal block sent from the central station OLT to one of the detached units ONU, this signal block corresponding to the signal blocks of FIG. 2. Line Z2 of FIG. 3 shows this signal block upon reception in the first detached unit ONU1 immediately adjacent to the central; because of the negligible fiber running time, the temporal position of the two signal blocks is substantially identical. Line Z3 shows a signal block in the temporal position in which it is sent from the first detached unit ONU1 to the central. The frame, and thus the start of these signal blocks, has been shifted forward by a time corresponding to a frame offset RO between the transmission cycle and the reception cycle of the detached units. This frame offset RO is valid for all detached units of the inventive TDM/TDMA system and is calculated from the length of the anticipation window EWF of the central multiplied by the number of range zones decremented by one.

In the range zone 1, the delay element T of each detached unit is set to a second basic delay GDB1 that represents the sum of the first basic delay GD1 and the frame offset RO according to FIG. 3. The position of the transmission time of the first detached unit ONU1 according to line Z3 thus corresponds to the reception time in the central station OLT according to line Z4 and the specified position according to line Z5 again corresponds to those of FIG. 2.

The third detached unit ONU3 is located at a distance of approximately 11 km fiber length from the central station OLT, so that the signal blocks shown in line Z6 arrive with a time shift. The time shift corresponding to the frame offset RO and the second basic delay GDB 1 is again valid for the transmission of the signal blocks corresponding to line Z7 by the third detached unit ONU3. After a running time of approximately 110 microseconds for a link having a fiber length of 11 km, the signal block is received in the central station OLT in the position shown in line Z8, which directly corresponds to the specified position of line Z9. It thus follows that no additional correction of running time is required for the third detached unit ONU3, whereas the first detached unit ONU1 requires and additional running time correction LZK so that the test packet signals in the useful signal transmission arrive in the anticipation window EWF of the central station OLT. Controlled by the latter, the delay element T of the first detached unit ONU1 is switched according to the correction in running time that has been calculated.

Line Z1 in FIG. 4 again shows a signal block that is transmitted from the central station OLT to the fourth detached unit ONU4 located at 9 km fiber length from the central station OLT and that, according to line Z2, arrives after a corresponding running time. It is also valid for the detached units in the range zone 2 that the transmission cycle to the central station OLT, and thus the frame for the signal blocks, begins one frame offset RO earlier compared to the frame of the signal blocks received from the central station OLT. The basic delay GDB2 for the range zone 2 is selected such that the test packet still just falls at the beginning of the anticipation window EWF with the given frame offset at the lower limit of the range zone. A lead in the output of the signal blocks from the detached units ONU4 and ONU5 arranged in the range zone 2 thereby arises. The signal blocks sent from the respective detached unit to the central station OLT during the reception of the signal blocks of the signals cannot yet contain the response to control instructions of the signal blocks; this response ensues at the earliest in the transmission cycle, (specifically, the signal block thereof) following the respective reception cycle for all detached units of the inventive TDM/TDMA system.

Line Z4 of FIG. 3 shows the signal block sent by the fourth detached unit ONU4 upon reception in the central station OLT, i.e. after a running time corresponding to a fiber length of 9 km. It can be seen that the test packet signals of this signal block still just occur in the anticipation window EWF of the central station OLT, i.e. line Z4 and line Z5 as well of FIG. 4 correspond to lines Z4 and Z5 of FIG. 3, so that a running time correction LZK is also to be inserted in the fourth detached unit ONU4 as in the first detached unit ONU1. This results in the overlap of the range zones being uncritical, so that no complicated measurements are required before the calibration or checking procedure for the division into range zones.

Figure 4:
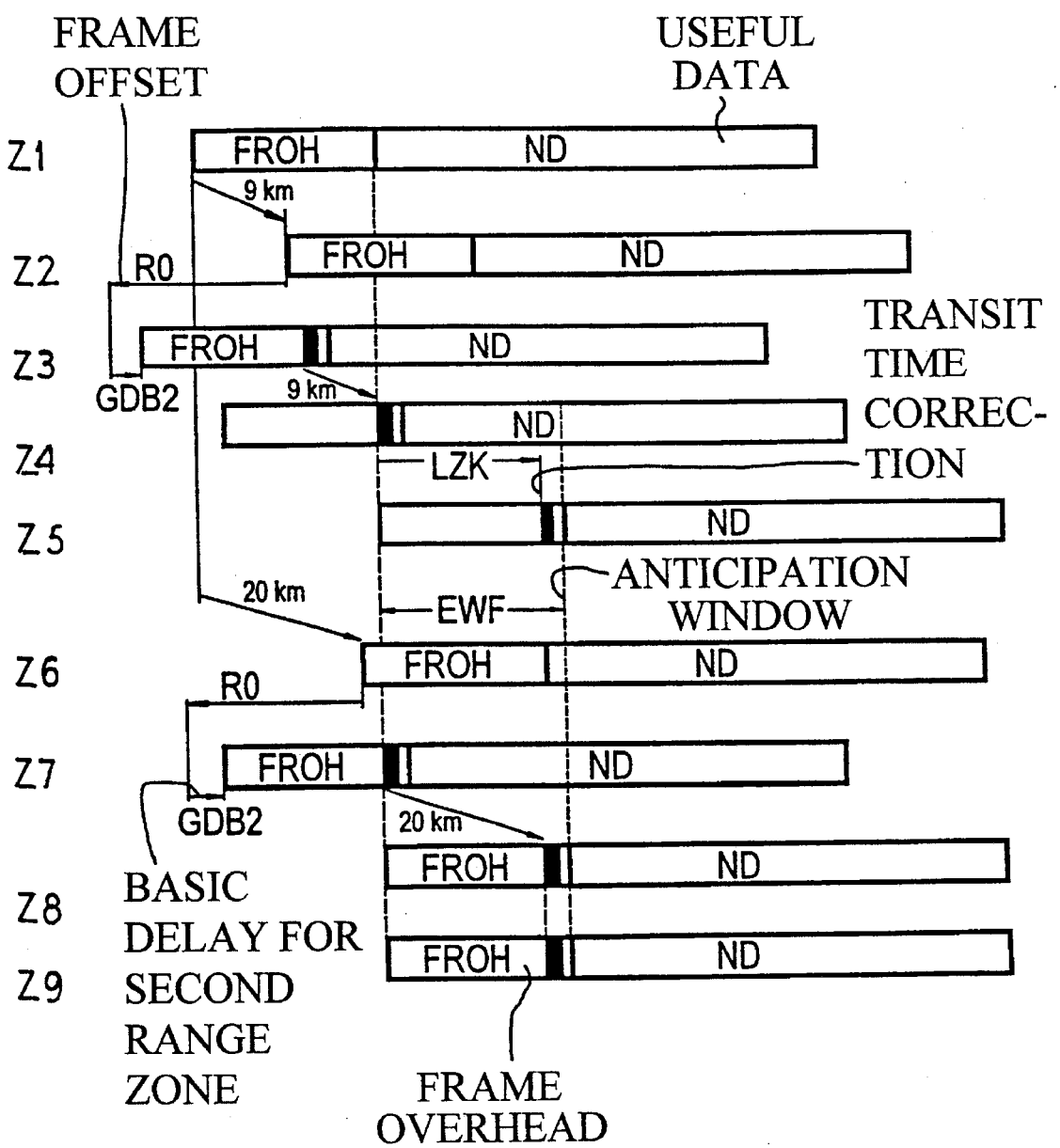
FIG. 4 illustrates a calibration or checking procedure in a second range of distances for the system of FIG. 1 in accordance with the principles of the present invention.

Line Z6 of FIG. 4 shows the position of a signal block received in the fifth detached unit ONU5. This detached unit is located at the maximum distance of approximately 20 km fiber length from the central station OLT, so that the signal block is received correspondingly delayed. During assembly, a time shift corresponding to a frame offset RO having the length (duration) of an anticipation window multiplied by the number of range zones decremented by one is also preset in the fifth detached unit ONU5. Corresponding to the allocation to the range zone 2, the basic delay GDB2 for the second range zone is set, just as for the fourth detached unit ONU4, so that the fifth detached unit ONU5 already begins sending its signal blocks to the central station OLT before the beginning of the reception of the signal blocks sent from the central station OLT. After a running time corresponding to a fiber length of 20 km, these signal blocks are received by the central station OLT corresponding to line Z8; comparison to line Z9 shows that a reception at the specified position is thereby achieved.

The TDM/TDMA system of the invention only contains detached units ONU in two range zones, however, it can easily be seen that a division into three range zones having correspondingly graduated frame offset RO is easily possible for a further increase of the range.

Although modifications and changes may be suggested by those skilled in the art, it is the intention of the inventor to embody within the patent warranted hereon all changes and modifications as reasonably and properly come within the scope of his contribution to the art.

We claim as our invention:

1. An optical TDM/TDMA system comprising:

central station means for emitting optical TDM signal blocks in a predetermined first transmission cycle of TDM signal blocks in a frame format and for receiving optical TDMA signal blocks;

a plurality of subscriber-proximate, detached means, each disposed at a transmission distance from said central station means, for receiving said TDM signal blocks from said central station means in a reception cycle and for emitting said TDMA signal blocks in reply to said TDM signal blocks, said plurality of detached means collectively emitting said TDMA signal blocks in a second transmission cycle of said TDMA signal blocks in said frame format with each detached means emitting a signal block into said second transmission cycle at a position in said second transmission cycle dependent on the transmission distance of that detached means from said central station means, said plurality of detached means including at least two detached means respectively disposed at different transmission distances from said central station means;

an optical branch network connecting said central station means to each detached means via which said TDM and TDMA signal blocks are transmitted;

said central station means including means for defining an anticipation window for each detached means during which a TDMA signal from that detached means is expected to be present in said second transmission cycle;

said plurality of detached means being divided into at least two range zones of respectively different transmission distances;

all detached means in each range zone including delay means for delaying emission of a TDMA signal block from that detached means, following reception of a TDM signal block, by a delay dependent on the range zone, with all detached means in a range zone at a longest transmission distance having a first delay and all detached means respectively in other range zones having further respective delays longer than said first delay; and means for introducing a frame offset between said first and second transmission cycles equal to a duration of said anticipation window multiplied by the plurality of range zones decremented by one, and for initiating the second transmission cycle in reply to the first transmission cycle only after completion of said reception cycle.

2. An optical TDM/TDMA system as claimed in claim 1 wherein said plurality of range zones comprises two range zones, and wherein said first delay of all detached means in one of said two range zones at a larger transmission distance being selected, given said frame offset, so that a signal block emitted by a detached unit at a lower limit of said range zone at said larger transmission distance arrives at said central station just coinciding with a beginning of said anticipation window.

3. An optical TDM/TDMA system as claimed in claim 2 wherein a first of said range zones comprises all detached units respectively having a transmission distance in a range of 0 through approximately 11 km and wherein said second range zone comprises all detached units having a transmission distance of approximately 9 through approximately 20 km.

4. A method for operating and constructing a TDM/TDMA system comprising the steps of:

emitting optical TDM signal blocks in a predetermined first transmission cycle of TDM signal blocks in a frame format from a central station, and receiving optical TDMA signal blocks at said central station;

receiving said TDM signal blocks collectively in a reception cycle in a plurality of subscriber-proximate, detached units each disposed at a distance from said central station;

emitting a second transmission cycle of said TDMA signal blocks in said frame format collectively from said plurality of detached units in reply to said first transmission cycle with each detached unit emitting a signal block into said second transmission cycle at a position in said second transmission cycle dependent on the transmission distance of that detached unit from said central station;

disposing at least two of said detached units at respectively different transmission distances from said central station;

defining an anticipation window at said central station for each detached unit during which a TDMA signal from that detached unit is expected to be present in said second transmission cycle;

dividing said plurality of detached units into at least two range zones of respectively different transmission distances;

delaying emission of said TDMA signal block from each detached unit respectively in a range zone, following receipt of a TDM signal block, by a delay dependent on the range zone, with all detached units in a range zone at a largest transmission distance having a first delay and all detached units respectively in other range zones having respective further delays larger than said first delay;

introducing a frame offset between said first and second transmission cycles equal to a duration of said anticipation window multiplied by the plurality of range zones decremented by one; and initiating said second transmission cycle in reply to said first transmission cycle only after completion of said reception cycle.

5. A method as claimed in claim 4 wherein the step of dividing said detached units into at least two range zones comprises dividing said plurality of detached units into two range zones, and providing all detached units in one of said two range zones at a larger transmission distance so that a signal block emitted by a detached unit at a lower limit of said range zone just coincides with a beginning of said anticipation window with said frame offset taken into account.

6. A method as claimed in claim 5 wherein the step of dividing said detached units into at least two range zones comprises dividing all detached units into having a transmission distance in a range of 0 through approximately 11 km into a first of said range zones and dividing all detached units having a transmission distance of approximately 9 through approximately 20 km into a second of said range zones.

* * * * *